United States Patent
Tsun et al.

(10) Patent No.: US 8,219,640 B2
(45) Date of Patent: *Jul. 10, 2012

(54) CONTENT REQUEST OPTIMIZATION

(75) Inventors: Stephen Tsun, Cupertino, CA (US);
Deepak Jindal, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/685,244

(22) Filed: Jan. 11, 2010

(65) Prior Publication Data

US 2010/0115064 A1    May 6, 2010

Related U.S. Application Data

(63) Continuation of application No. 11/554,348, filed on Oct. 30, 2006, now Pat. No. 7,657,611.

(51) Int. Cl.
*G06F 15/16* (2006.01)
*G06Q 30/00* (2006.01)

(52) U.S. Cl. ........ 709/217; 709/219; 709/208; 705/14.4

(58) Field of Classification Search .................. 709/217, 709/219, 208; 705/14.4
See application file for complete search history.

(56) References Cited

U.S. PATENT DOCUMENTS

| | | | |
|---|---|---|---|
| 5,038,346 A | 8/1991 | Courtois | |
| 6,067,565 A | 5/2000 | Horvitz | |
| 6,438,592 B1 | 8/2002 | Killian | |
| 6,725,421 B1 | 4/2004 | Boucher et al. | |
| 6,775,267 B1 | 8/2004 | Kung et al. | |
| 6,795,848 B1 | 9/2004 | Border et al. | |
| 7,136,875 B2 | 11/2006 | Anderson et al. | |
| 2001/0054001 A1 | 12/2001 | Robinson | |
| 2002/0055966 A1 | 5/2002 | Border et al. | |
| 2002/0072989 A1 | 6/2002 | Van De Sluis | |
| 2002/0091763 A1 | 7/2002 | Shah et al. | |
| 2002/0165955 A1* | 11/2002 | Johnson et al. | 709/224 |
| 2003/0065580 A1 | 4/2003 | Obata et al. | |
| 2003/0093485 A1* | 5/2003 | Dougall et al. | 709/208 |
| 2003/0167257 A1 | 9/2003 | De Bonet | |
| 2003/0167324 A1 | 9/2003 | Farnham et al. | |
| 2004/0093327 A1 | 5/2004 | Anderson et al. | |
| 2004/0148275 A1 | 7/2004 | Achlioptas | |
| 2004/0205165 A1 | 10/2004 | Melamed et al. | |

(Continued)

FOREIGN PATENT DOCUMENTS

JP    9222974 A    8/1997

(Continued)

OTHER PUBLICATIONS

Fisher & Saksena et al., "Link Prefetching in Mozilla: A Server-Driven Approach" Eighth Internaltional Workshop on Web Content Caching and Distribution, Sep. 29-Oct. 1, 2003 [A12 on IDS dtd Jan. 11, 2010].*

(Continued)

*Primary Examiner* — Ashok Patel
*Assistant Examiner* — Evans Desrosiers
(74) *Attorney, Agent, or Firm* — Fish & Richardson P.C.

(57) ABSTRACT

Content item requests are identified in a web page source document. For each request, it is determined if a content item request has been generated, and if a content item request has not been generated, a content item request for all requests in the web page source document is generated.

13 Claims, 6 Drawing Sheets

U.S. PATENT DOCUMENTS

| | | | |
|---|---|---|---|
| 2005/0210000 A1 | 9/2005 | Michard | |
| 2005/0222903 A1* | 10/2005 | Buchheit et al. | 705/14 |
| 2005/0256940 A1 | 11/2005 | Henderson et al. | |
| 2006/0218304 A1 | 9/2006 | Mukherjee et al. | |
| 2007/0136579 A1 | 6/2007 | Levy et al. | |
| 2008/0104194 A1 | 5/2008 | Tsun et al. | |
| 2009/0024548 A1 | 1/2009 | Zhu et al. | |

FOREIGN PATENT DOCUMENTS

| | | | |
|---|---|---|---|
| JP | 2000148675 A | 5/2000 | |
| JP | 2003223389 A | 8/2003 | |
| JP | 2005267499 A | 9/2005 | |
| WO | WO02/15531 A1 | 2/2002 | |

OTHER PUBLICATIONS

W3C, "XHTML 2.0, W3C Working Draft May 6, 2003", www(dot)w3(dot)org/TF/2003/WD-xhtml2-20030506, May 6, 2003.*

Fisher & Saksena et al., "Link Prefetching in Mozilla: A Server-Driven Approach*" Eighth International Workshop on Web Content Caching and Distribution. Sep. 29-Oct. 1, 2003, 6 pages, XP002556392, [online] [retrieved on Nov. 2009] [retrieved from the internet: <URL:http://2003.iwcw.org/papers/fisher.pdf>.

Padmanabhan, V.N., "Improving World Wide Web Latency*" University of California Report, May 1, 1995, 24 pages, XP002041557.

Supplemental European Search for Application No. EP 07844736.4-2201, dated Dec. 10, 2009, 3 pages.

Becta Technical Papers "Web Caches" 2005 [online], [retrieved on Jan. 28, 2008]. Retrieved from the Internet <URL:http://foi.becta.org.uk/content_files/corporate/resources/technology_and_education_research/web_caches.pdf>.

Brattli, T. "Dynamic data using the DOM and Remote Scripting." dhtml central.com. Feb. 21, 2001 (4 pages).

Microsoft, "Microsoft Corporation" Microsfot.com, Oct. 28, 2005 (retrieved by archive.org).

Fisher & Saksena et al., "Link Prefetching in Mozilla: A Server-Driven Approach*" Eighth International Workshop on Web Content Caching and Distribution. Sep. 29-Oct. 1, 2003, 6 pages, XP002556392, [online] [retrieved on Nov. 2009] [retrieved from the internet: <URL:http://2003.iwcw.org/papers/fisher.pdf>.

Mohan, C., "Caching Technologies for Web Applications" Sep. 2001 [online], [retrieved on Jan. 28, 2008]. Retrieved from the Internet: <URL:http://www.almaden.ibm.com/u/mohan/Caching_VLDB2001.pdf>.

"Nagle's Algorithm." Wikipedia, the free encyclopedia [online], pp. 1-2 [retrieved on Jan. 7, 2009]. Retrieved from the Internet <http://en.wikipedia.org/wiki/Nagle's_algorithm>.

Nagle, J. "Congestion Control in IP/TCP Internetworks." Network Working Group [online]. Jan. 6, 1984, pp. 1-9. [retrieved on Jan. 7, 2009]. Retrieved from Internet <http://tools.ietf.org/rfc/rfc896.txt>.

U.S. Appl. No. 11/554,419, filed Oct. 30, 2006, Stephen Tsun.

U.S. Appl. No. 11/554,423, filed Oct. 20, 2006, Stephen Tsun.

Padmanabhan, V.N., "Improving World Wide Web Latency*" University of California Report, May 1, 1995, 24 pages, XP002041557.

Sanders, "JavaScript Design," New Riders, Dec. 2001. (Relevant section included).

Xie, X. et al. "Maximizing Information Throughout for Multimedia Browsing on Small Displays" in Multimedia and Expo, 2004, ICME '04. IEEE International Conference, vol. 27-Jun. 30, 2004, pp. 2143-2146 vol. 3, [online], [retrieved Jan. 28, 2008]. Retrieved from the Internet: <http://research.microsoft.com/asia/dload_files/group/ims/26.pdf>.

Xing, X. et al., "Maximizing Information Throughout for Multimedia Browsing on Small Displays" In Multimedia and Expo, 2004, ICME '04. IEEE International Conference, vol. 27-Jun. 30, 2004, pp. 2143-2146 vol. 3, [online], [retrieved Jan. 28, 2008]. Retrieved from the Internet: <http://research.microsoft.com/asia/dload_files/group/ims/26.pdf.

Communication from European Patent Office for Application No. EP 07844736.4-2201, dated Jan. 5, 2010, 7 pages.

Communication Pursuant to Article 93(3) EPC for EP Application No. 07 844 736.4-2201 dated Apr. 5, 2012, 9 pages.

* cited by examiner

CONTENT REQUEST OPTIMIZATION

RELATED APPLICATION

This application is a continuation application of and claims priority to U.S. application Ser. No. 11/554,348, filed on Oct. 30, 2006, U.S. Pat. No. 7,657,611, issued on Feb. 2, 2010, and entitled "CONTENT REQUEST OPTIMIZATION," the entirety of which is hereby incorporated herein by reference.

FIELD

This disclosure relates to information retrieval.

BACKGROUND

Content displayed on a web page can be generated by one or more content item servers in response to content item requests that are generated during the rendering of the web page by a client device. Often a publisher of a web page may define multiple content item environments, e.g., advertisement slots, for content items, e.g., advertisements, to be displayed within a web page. Typically, each content item environment has an associated content item request, e.g., an advertisement request, that is transmitted to a content item server, e.g., an advertisement server. When the web page is rendered by a client device that has requested the publisher's web page, a content item will be displayed in each content item environment.

A web page having multiple content item environments can, however, generate excessive traffic to the content item server. Additionally, because web page instructions are often interpreted, the content item requests are generated as each content item request instruction is processed. Accordingly, a first content item request for a web page is transmitted and served without knowledge of any subsequent content item requests that may be encountered for that page. Thus, each content item served by the content item server for a web page is independent of other content items served by the content item server for that page. Accordingly, a suboptimal collection of content items, e.g., advertisements, may be served for a web page if the rendering of the web page generates multiple content item requests.

SUMMARY

Disclosed herein is a content request optimization system that includes first and second instructions stored in a data store. The first instructions are configured to define content item environments in a page environment. The second instructions are associated with each content item environment, and configured to determine whether a content item request has been generated by any of the second instructions, and in response to determining that a content item request has not been generated by any of the second instructions, generate a content item request for content items for each of the content item environments.

A method for content request optimization identifies requests in a web page source document. For each identified request, a determination is made if a content item request has been generated. If a content item request has not been generated, then a content item request for all requests in the web page source document is generated.

Another example content request optimization system includes a data store storing a web page source files. The web page source files include declaration instructions configured to define advertisement slots and rendering instructions associated with the advertisement slots. The rendering instructions are configured to determine whether an advertisement request has been generated, and in response to determining that an advertisement request has not been generated, transmit an advertisement request for each of the advertisement slots.

Another example content request optimization system includes a data store storing a web page source files. The web page source files include declaration instructions, fetching instructions, and rendering instructions. The declaration instructions are configured to define content item environments, and the fetching instructions are configured to generate content item requests for each of the content item environments. The rendering instructions are associated with the advertisement slots and configured to generate local content item calls to retrieve content items received in response to the content item requests and render the retrieved content items in corresponding content item environments.

The systems and methods described herein may realize one or more of the following features and advantages. A single content item request for a plurality of content item environments can be generated, reducing content item server traffic. A content item server may optimize the selection of content items for a requesting web page, as the content items may be selected based on the content item request and other selected content items for the requesting web page. These and other advantages and features may be realized by the systems and methods described below.

DETAILED DESCRIPTION

Figure 1:
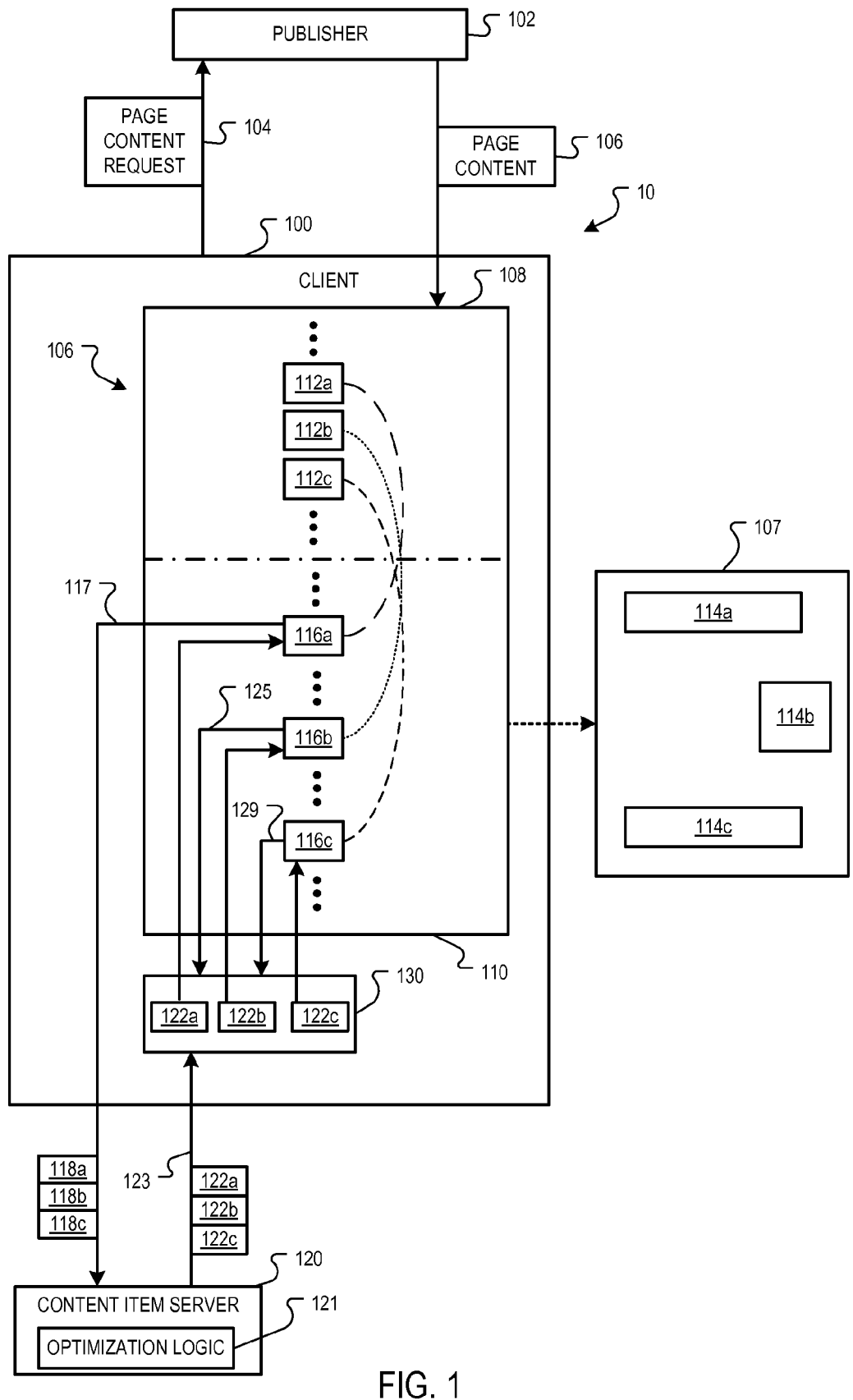
FIG. 1 is a block diagram of an example system for requesting content from a source.

FIG. 1 is a block diagram of an example system 10 for requesting content items from a source, e.g., a content item server. In one implementation, the content items can be advertisements, and the content item server can be an advertisement server. Different types of content can also be requested, e.g., weather, driving directions, trivia, etc.

The requesting device, in the implementation shown, is a client system 100 that is configured to visit web pages over a network, e.g., the Internet. The client system 100 can, for example, be a web browser, a computing device, a mobile communication device, or some other device executing network navigation software and the like. The web address visited by the client system 100 can be resolved to identify a publisher 102, e.g., a server, hosting a corresponding web page. The client system 100 thus sends a web page content request 104 to the publisher 102 for the web page content 106, e.g., a hypertext markup language (HTML) source document, and the publisher 102, in response to the request, provides the web page content 106 to the client system 100.

In an implementation, the web page content 106 can, for example, include a head section 108 and a body section 110, each section having interpreted instructions. The head section 108 can, for example, be interpreted before the body section 110. In an implementation, first instructions 112a, 112b and 112c, e.g., declaration instructions, are executed in the head section 108 to define one or more content item environments 114a, 114b, and 114c to be rendered in a corresponding web page 107 to be displayed on a display device. For example, the content item environments 114a, 114b, and 114c can comprise advertisement slots that are rendered and displayed in the approximate positions as depicted in the rendered web page 107, e.g., in top slot, a middle slot, and a bottom slot. In one implementation, the content item environments 114a, 114b, and 114c can be synchronous environments, e.g., divs within the same frame of the rendered web page 107. In another implementation, the content item environments 114a, 114b, and 114c can be asynchronous environments, e.g., iFrames within the rendered web page 107.

Included in the body section 110 are second instructions 116a, 116b and 116c, e.g., rendering instructions, that are associated with the content item environments 114a, 114b and 114c. The second instructions 116 are configured to invoke a request process that determines whether a content item request has been generated by any of the second instructions 116. In one implementation, in response to determining that a content item request has not been generated by any of the second instructions 116, the particular set of second instructions 116 being executed, e.g., second instructions 116a, generate a combined content item request 117 for content items for each of the content item environments 114a, 114b and 114c.

In one implementation, the first instructions 112a, 112b and 112c are interpreted before the second instructions 116a, 116b and 116c are processed by the client device 100. Accordingly, the content environments 114a, 114b and 114c are already defined when any of the second instructions 116a, 116b and 116c are executed. Thus, when the first set of second instructions 116 are executed, e.g., execution of the second instructions 116a, the process invoked by the second instructions 116a can determine that the content environments 114b and 114c are also defined, and thus generate the combined content item request 117.

In one implementation, the combined content item request 117 can include a concatenation of content item requests 118a, 118b and 118c that corresponds to requests for the content item environments 114a, 114b and 114c. In response, the content item server 120 can, for example, optimize the selection of corresponding content items 122a, 122b and 122c served. In one implementation, the content item server 120 includes optimization logic 121 to optimize the selection of the content items 122a, 122b and 122c. For example, the content items 122a, 122b and 122c and be selected according to the optimization logic 121 to ensure that disparate content items are selected, e.g., to ensure that none of the selected content items are duplicate content items.

In one implementation, the content item requests 118a, 118b and 118c can, for example, include an identical pageview identifier, and the optimization logic 121 can select content items 122a, 122b and 122c based on the pageview identifier and the address of the content item requests 118a, 118b and 118c. Other content item optimization selection processes can also be used.

The content items 122a, 122b and 122c can, for example, be transmitted to the client system 100 in a combined reply 123 and stored in a data store 130, e.g., a cache associated with a browser running on the client 100. In response to the combined request 117 issued by the second instructions 116a, the content item 122a is rendered in the content menu item environment 114a. Thereafter, upon execution of the second instructions 116b, the request process determines that a content item request has previously been generated, e.g., the combined content item request 117 and/or the content item requests 118a, 118b and 118c. In response to this determination, the second instructions 116b generate a local content item request 125 to the data store 130, which, in turn, provides the content item 122b to be rendered in the corresponding content item slot 114b. The second instructions 116c also generate a local content item request 129 to retrieve the content item 122c stored in the data store for rendering in the content item environment 114c.

Figure 2:
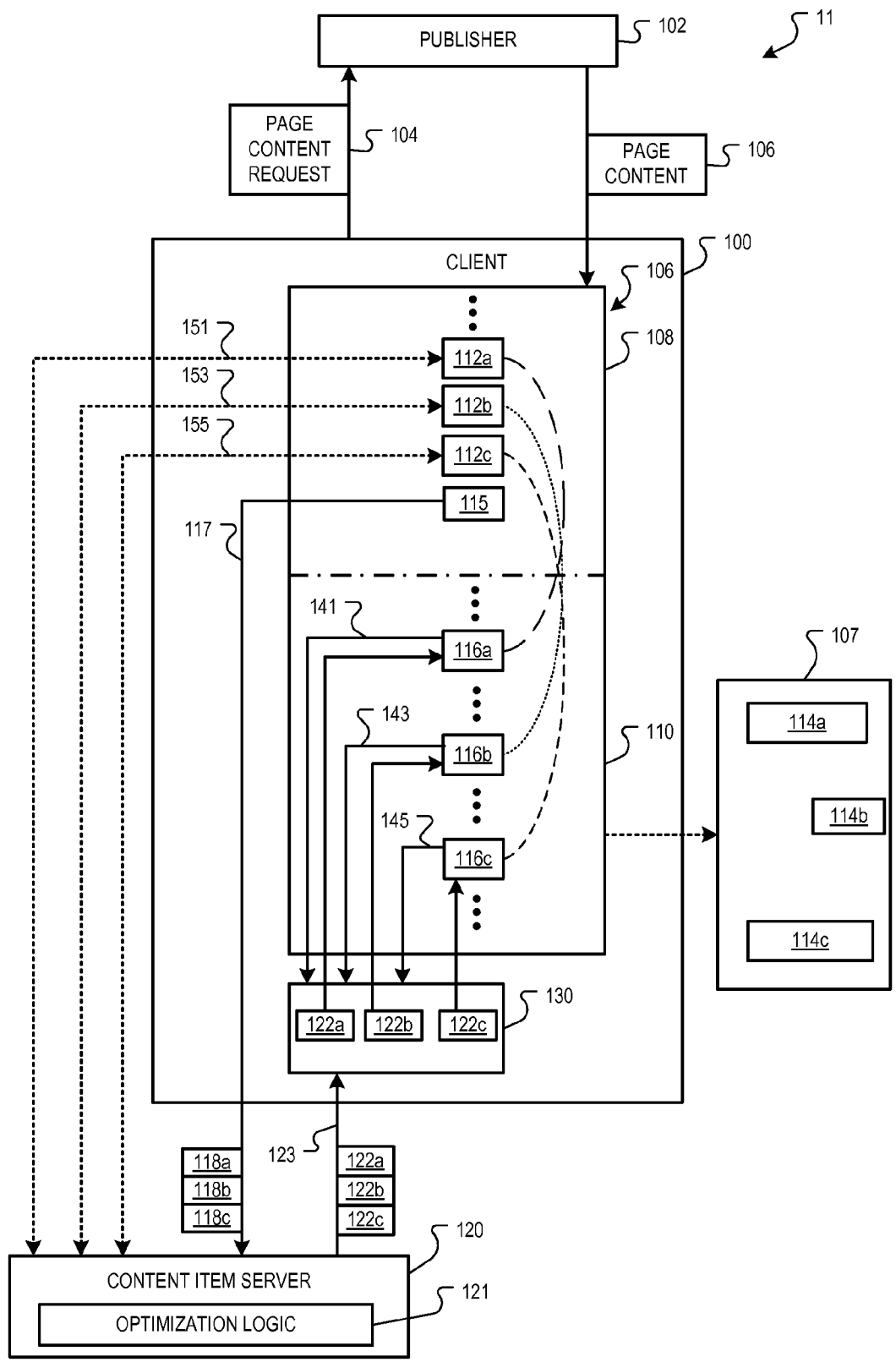
FIG. 2 is a block diagram of another example system for requesting content from a source.

FIG. 2 is a block diagram of another example system 11 for requesting content from a source. The system 11 of FIG. 2 operates in a similar manner to the system 10 of FIG. 1, except that separate content item request instructions 115 are executed to generate the combined content item request 117 that includes content requests 118a, 118b and 118c for the content item environments 114a, 114b and 114c. The second instructions 116a, 116b and 116c are configured to generate local content item requests 141, 143 and 145, respectively, to retrieve and render the stored content items 122a, 122b and 122c in the content item environments 114a, 114b and 114c.

In another implementation, each of the first instructions 112a, 112b and 112c can retrieve content item environment characteristics, e.g., height and width dimensions. For example, the first instructions 112a, 112b and 112c can transmit content item environment requests 151, 153 and 155, respectively to the content item server 120 to retrieve content item environment characteristics for the content item environments 114a, 114b and 114c. Often a publisher or a content item provider may modify a content item environment 114; accordingly, by storing the content item environment modifications at the content item server 120, the publisher need not modify the web page content 106.

Figure 3:
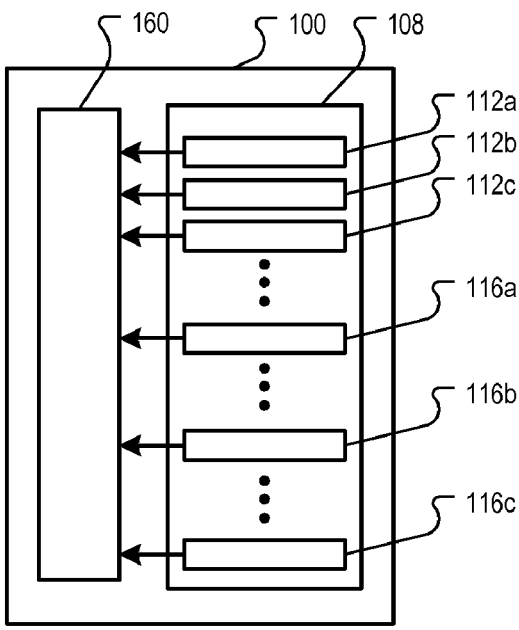
FIG. 3 is a block diagram of a source document and a corresponding cached instruction library.

FIG. 3 is a block diagram of an example source document 106 and a corresponding cached instruction library 160. The cached instruction library 160 can, for example, include one or more functions, such as javascript functions, that are invoked by the first instructions 112 and the second instructions 116. In one implementation, the instructions library 160 can be provided by the content item server 120 and stored in a local data store on the client system 100. For example, upon rendering the web page content 106 and encountering first instruction 112, the client system 100 can determine if the instruction library 160 is stored in a local data store, e.g., a cache associated with a browser application. If the instruction library 160 is not stored in the local data store, the client system 100 can request the instruction library 160 from the content item server 120.

By implementing function calls in the first instructions 112 and the second instructions 116 to the instruction library 160, the provider of the content server 120 may implement query changes and other content request changes that are essentially transparent to providers of the publisher systems 102.

Figure 4:
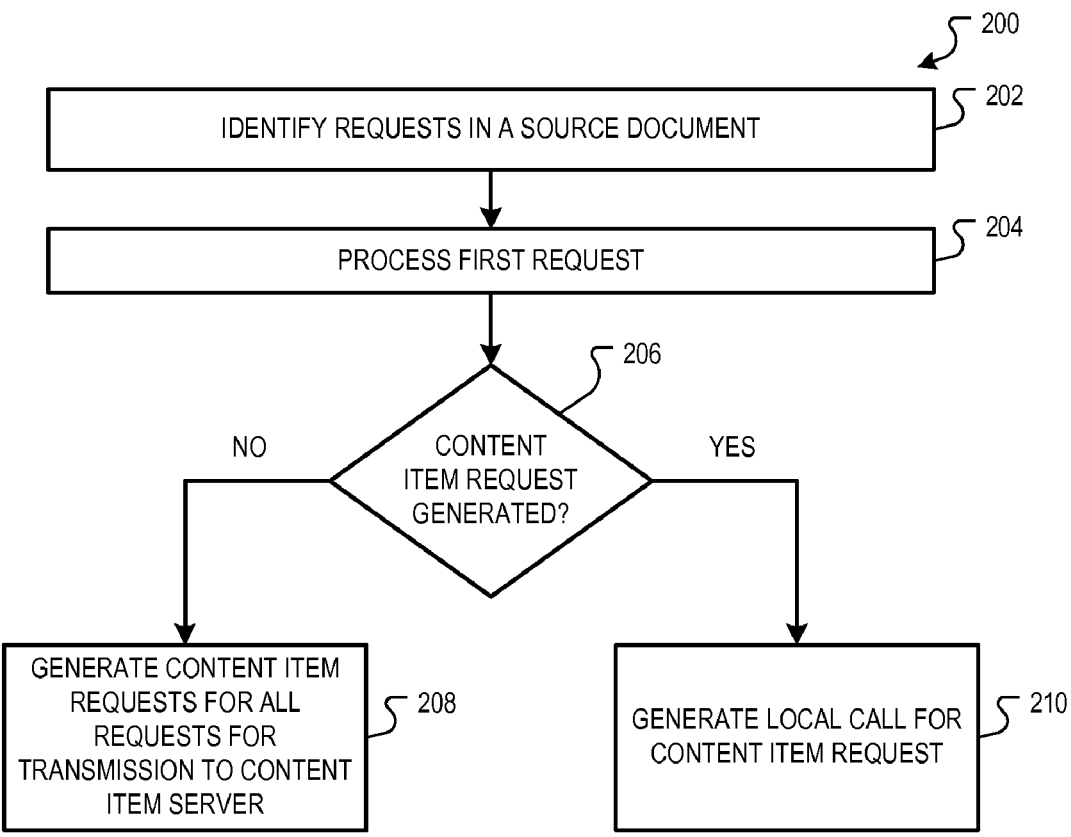
FIG. 4 is a flow diagram of an example process for handling content item requests.

FIG. 4 is a flow diagram of an example process 200 for handling content item requests. The example process 200 can, for example, be implemented in the client system 100 by rendering the web page content 106 and executing the instructions 112 and 116.

Stage 202 identifies requests in a source document. For example, a client system 100, such as a web browser, can execute the instructions 112 to identify requests in a source document, such as web page content 106.

Stage 204 processes the first request. For example, a client system 100, such as a web browser, can execute the instructions 116a related to a content item request for the content item environment 114a.

Stage 206 determines if a content item request to a content item server has been generated. For example, a client system 100, such as a web browser, can execute the instructions 116a to determine if a combined content item request 117 or content item requests 118a, 118b and/or 118c have been generated and/or transmitted to the content item server.

If stage 206 determines that a content item request to a content item server has not been generated, then stage 208 generates content item requests for all requests in the web page for transmission to the content item server. For example, a client system 100, such as a web browser, can execute the instructions 116a to generate the combined request 117.

If, however, stage 206 determines that content item request to a content item server has been generated, then stage 210 generates local content item requests. For example, a client system 100, such as a web browser, can execute the instructions 116b and 116c to generate the local content item requests 125 and 129, respectively.

Figure 5:
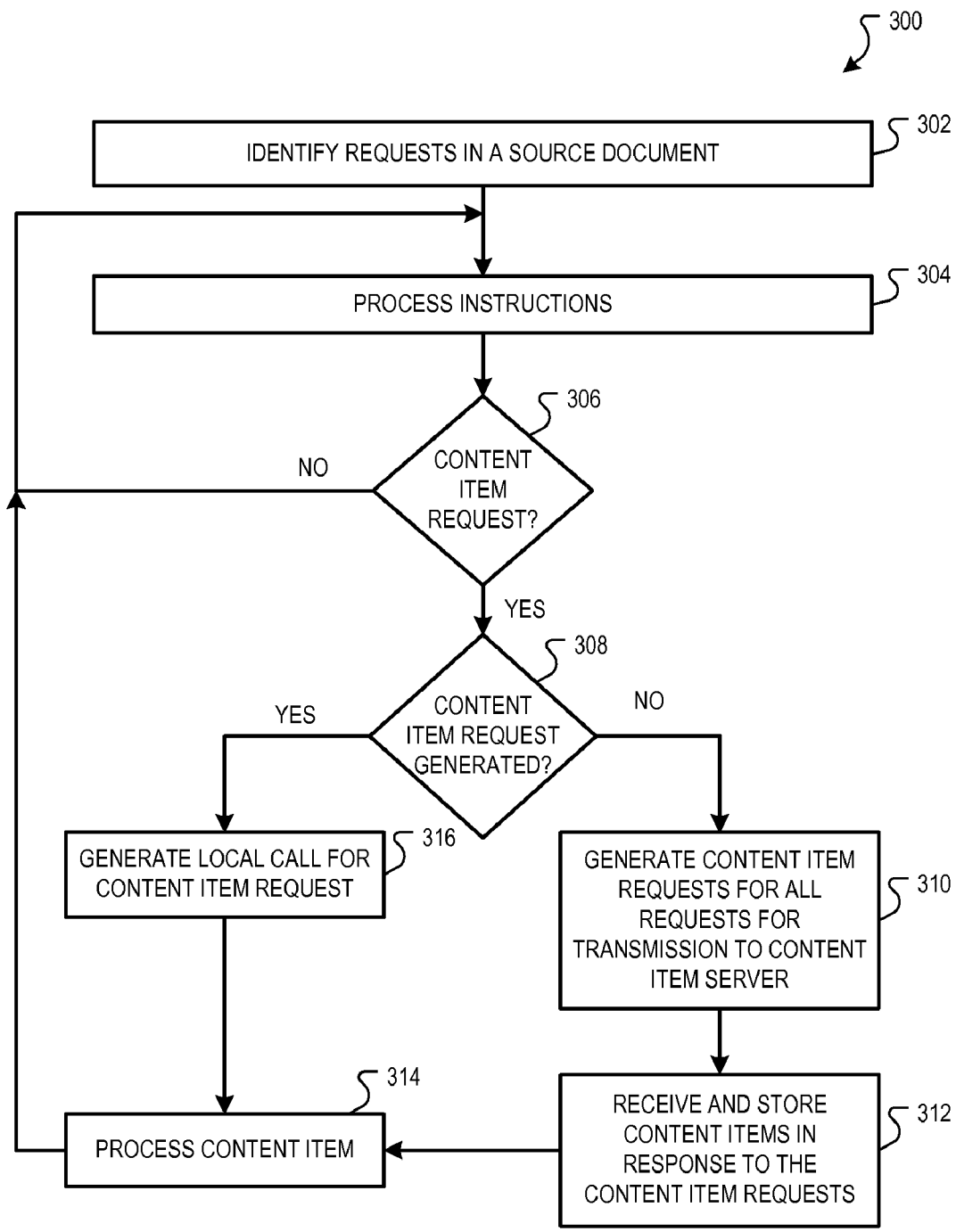
FIG. 5 is a flow diagram of another example process for handling content item requests.

FIG. 5 is a flow diagram of another example process 300 for handling content item requests. The example process 300 can, for example, be implemented in the client system 100 by rendering the web page content 106 and executing the instructions 112 and 116.

Stage 302 identifies requests in a source document. For example, a client system 100, such as a web browser, can execute the instructions 112 to identify requests in a source document, such as web page content 106.

Stage 304 processes instructions in the source document. For example, a client system 100, such as a web browser, can execute other instruction in the web page source document 106, such as formatting instructions, imaging instructions, javascripts, etc.

Stage 306 determines if the instructions are a content item request. For example, a client system 100, such as a web browser, upon executing the instructions 116a can determine that the instructions are content item request processing instructions.

If stage 306 determines that the instructions are not a content item request, then the process returns to stage 304. If, however, stage 306 determines that the instructions are a request instruction, then stage 308 determines if a content item request to a content item server has been generated. For example, a client system 100, such as a web browser, can execute the instructions 116a to determine if a combined content item request 117 or content item requests 118a, 118b and/or 118c have been generated and/or transmitted to the content item server.

If stage 308 determines that a content item request to a content item server has not been generated, e.g., the content item request is the first content item request to be processed, then stage 310 generates content item requests for all requests in the web page for transmission to the content item server. For example, a client system 100, such as a web browser, can execute the instructions 116a to generate a combined content item request 117.

After stage 310 processes, stage 312 receives and stores the content items that are provided in response to the content item requests, and stage 314 processes the content item for the first content item request. For example, a client system 100, such as a web browser, can receive and store in a data store, such as the data store 130, the content items 122a, 122b and 122c provided by the content item server 120. Thereafter, the content item 122a can be rendered in the content item environment 114a.

If, however, stage 308 determines that a content item request to a content item server has been generated, e.g., the content item request is a second or subsequent content item request to be processed, then stage 316 generates a local content item request, and stage 314 processes the content item for the subsequent content item request.

Figure 6:
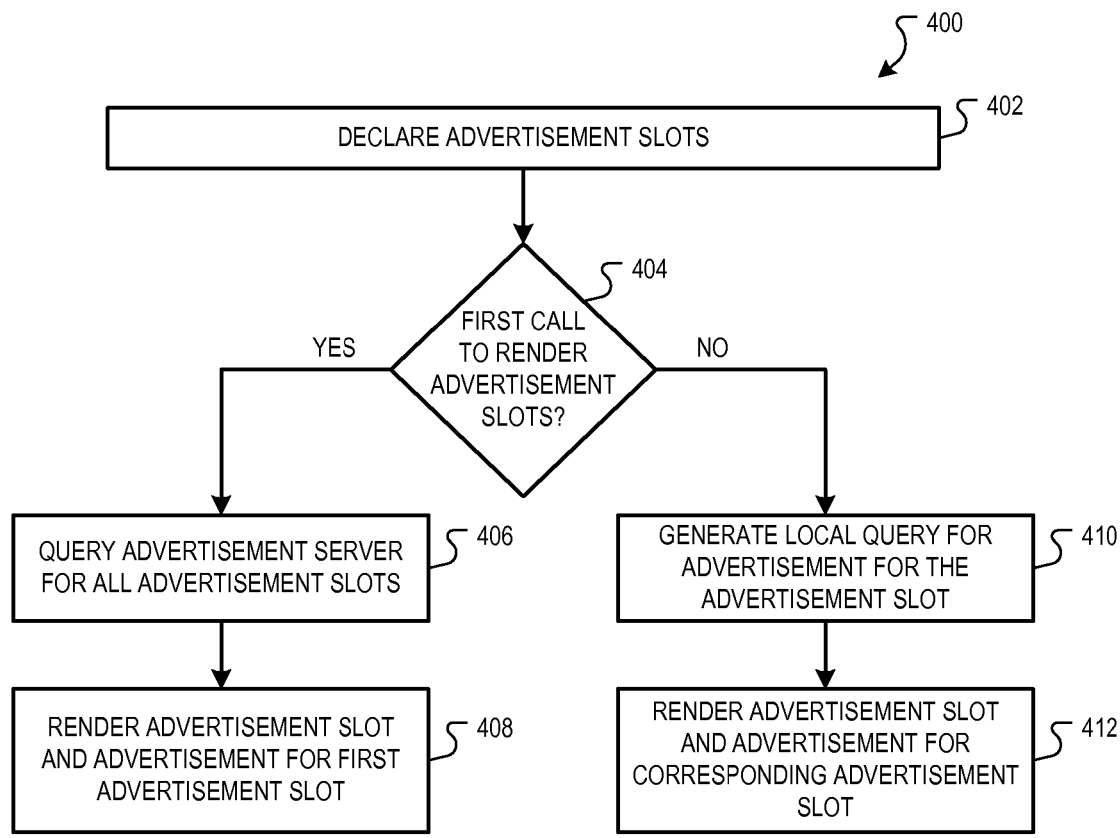
FIG. 6 is a flow diagram of another example process for handling content item requests.

FIG. 6 is a flow diagram of another example process 400 for handling content item requests. The example process 400 can, for example, be implemented in the client system 100 by rendering the web page content 106 and executing the instructions 112 and 116.

Stage 402 declares advertisement slots. For example, a client system 100, such as a web browser, can execute the instructions 112 to declare advertisement slots in a web page.

Stage 404 determines if a call to render an advertisement slot is a first call. For example, a client system 100, such as a web browser, can execute the instructions 116a to determine if a advertisement requests have been generated and/or transmitted to the an advertisement server.

If stage 404 determines that the call to render the advertisement slot is a first call, then stage 406 queries an advertisement server for all advertisement slots. For example, a client system 100, such as a web browser, can execute the instructions 116a to generate a combined advertisement request that includes advertisement requests for all advertisement slots in the web page. In one implementation, the combined request can include queries to fetch advertisements for all of the advertisement slots declared in stage 402. After stage 406 process, stage 408 renders an advertisement slot and an advertisement for the first advertisement slot. For example, a client system 100, such as a web browser, can execute the instructions 116a to render an advertisement slot and an advertisement received from an advertisement server.

If, however, stage 404 determines that the call to render the advertisement slot is not a first call, then stage 410 generates a local query for the advertisement for the advertisement slot. For example, a client system 100, such as a web browser, can execute the instructions 116b and 116c to generate local queries to a local data store, such as a cache associated with the web browser.

Stage 412 renders the advertisement slot and the advertisement for the corresponding advertisement slot. For example, a client system 100, such as a web browser, can execute the instructions 116b and 116c to render corresponding advertisement slots and advertisement received from an advertisement server and stored in the local data store.

Figure 7:
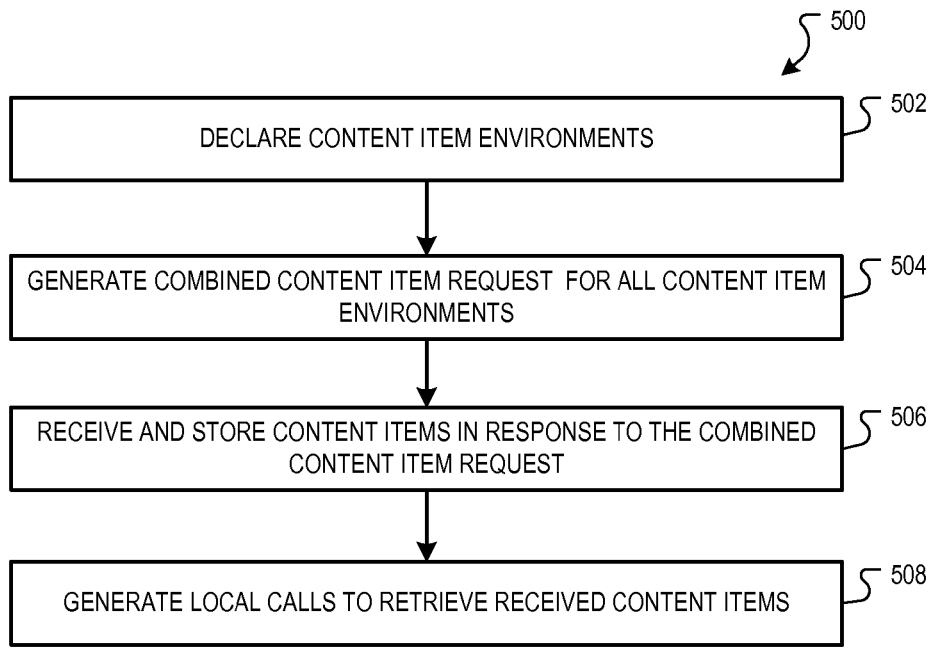
FIG. 7 is a flow diagram of another example process for handling content item requests.

FIG. 7 is a flow diagram of another example process 500 for handling content item requests. The example process 500 can, for example, be implemented in a client system 100 by rendering the web page content 106 and executing the instructions 112, 115 and 116.

Stage 502 declares content item environments. For example, a client system 100, such as a web browser, can execute the instructions 112a, 112b and 112c to declare the content item environments 114a, 114b and 114c.

Stage 504 generates a combined content item request for all content item environments. For example, a client system 100, such as a web browser, can execute the instructions 115 to generate a combined content item request 117.

Stage 506 receives and stores content items in response to the combined content item request. For example, a client system 100, such as a web browser, can receive and store the content items 122a, 122b and 122c in the data store 130, e.g., a cache associated with the web browser.

Stage 508 generates local calls to retrieve the received content items. For example, a client system 100, such as a web browser, can execute the instructions 116a, 116b, and 116c to generate local calls 141, 143 and 145 to the data store 130 to retrieve the content items 122a, 122b and 122c, respectively.

Figure 8:
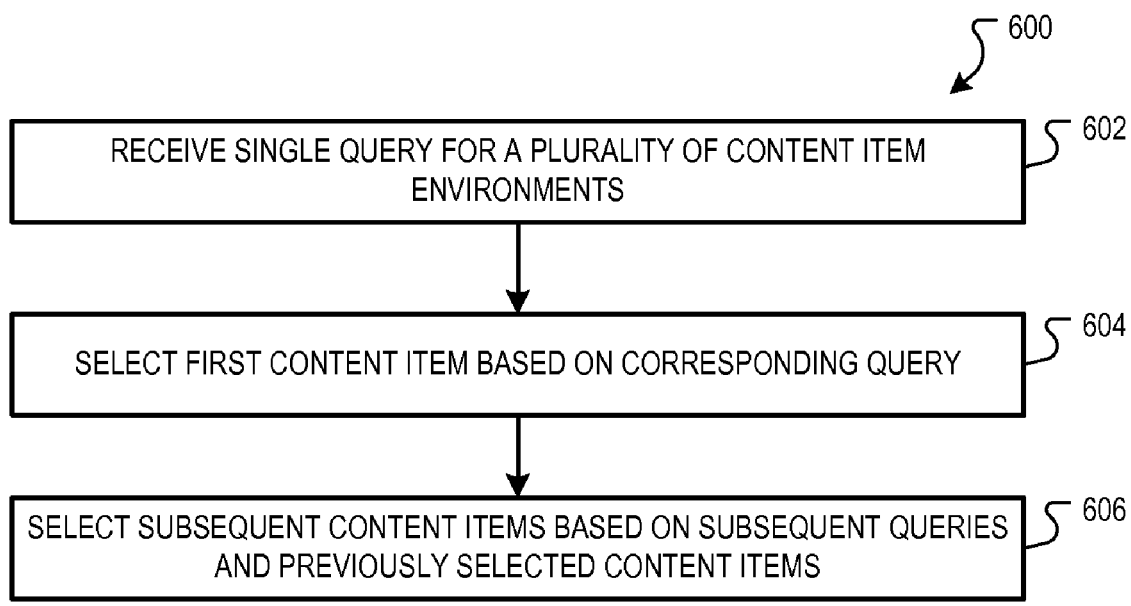
FIG. 8 is a flow diagram of an example process for responding to a consolidated content item request.

FIG. 8 is a flow diagram of an example process 600 for responding to a consolidated content item request. The example process 600 can, for example, be implemented in a content item server, such as the content item server 120, that include optimization logic, such as optimization logic 121.

Stage 602 receives a single query for a plurality of content item environments. For example, a combined content item request 117 can be received by the content item server 120. The combined content item request 117 can include multiple content item requests, e.g., 118a, 118b, and 118c. In one implementation, each content item request 118 includes a common identifier, e.g., the same pageview identifier.

Stage 604 selects a first content item based on a corresponding content item query. For example, the content item server 120 can select the content item 122a based on the content item request 118a.

Stage 606 selects subsequent content items based on subsequent queries and previously selected content items. For example, the content item server 120 can select the content items 122b and 122c based on the content item request 118b and 118c, and also based on the previously selected content item 122a. The selection process may be implemented in the optimization logic 121.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
identifying, at a client device, requests in a web page source document, the web page source document defining content item environments in a web page, and associating each content item environment with a corresponding request in the web page source document;
for each request:
determining, at the client device, if any of the requests have generated a content item request; and
in response to determining that a content item request has not been generated by any of the requests:
generating, at the client device, a combined content item request for content items for all requests in the web page source document, the content items including a corresponding content item responsive to each request;
receiving, at the client device, the content items in response to the combined content item request; and
storing in a data store, at the client device, the content items received; and
in response to determining that a content item request has been generated by any of the requests:
generating, at the client device, a local content item call to the data store for the content item corresponding to the request;
retrieving the content item from the content items stored in the data store in response to the local content item call; and
rendering the content item in a content item environment;
wherein the content items are advertisements.

2. The method of claim 1, wherein the content item environments comprise iframes.

3. The method of claim 1, wherein the web page source document includes instructions in the head section that define the content environments of the web page source document.

4. The method of claim 1, wherein determining if any of the requests have generated a content item request comprises determining if a content item request has been transmitted to a content item server.

5. The method of claim 1, wherein generating a combined content item request comprises:
generating, at the client device, a plurality of content item requests, each of the content item requests being a corresponding request for each request in the web page source document;
assigning, at the client device, an identical pageview identifier to each content item request; and
combining, at the client device, the plurality of content item requests into the combined content item request.

6. A system, comprising:
a data store storing instructions executable by a client device, the instructions stored in a source document defining a web page and including:
first instructions configured to cause the client device to render content item environments in a page environment of a web page rendered from the source document; and
corresponding second instructions associated with each content item environment and configured to cause the client device to perform operations comprising:
determining, for each second instructions associated with each content item environment:
if any of the second instructions have caused the client device to have generated a combined content item request; and
in response to determining that the client device has not generated a content item request from any of the second instructions:
generate, at the client device, a combined content item request for content items for all second instructions in the web page source document, the content items including a corresponding content item for each second instruction;
receive, at the client device, the content items in response to the combined content item request; and
store in a data store, at the client device, the content items received; and
in response to determining that the client device has generated a content item request from any of the second instructions:

generate, at the client device, a local content item call to the data store for the content item corresponding to the second instruction;

retrieve the content item from content items stored in the data store in response to the local content item call; and render the content item in the content item environment;

wherein the content items are advertisements.

7. The system of claim 6, wherein, the first and second instructions comprise interpreted instructions.

8. The system of claim 6, wherein:

the first instructions are located in a head section of the source document; and the second instructions are located in a body section of the source document.

9. The system of claim 6, wherein:

the first instructions and the second instructions are stored in the source document so that the first instructions are executed before the second instructions.

10. A system, comprising:

a data store storing a web page source file, the web page source file including:

declaration instructions configured to cause a client device to define advertisement slots in a web page; and corresponding rendering instructions associated with each of the advertisement slots and configured to cause the client device to perform operations comprising:

determining, for each rendering instruction:

if any of the rendering instructions have caused the client device to have generated a combined advertisement request;

in response to determining that the client device has not generated a combined advertisement request for any of the rendering instructions:

generating, at the client device, a combined advertisement request for advertisements for all rendering instructions in the web page source document, the advertisements including a corresponding advertisement for each rendering instruction;

receiving, at the client device, the advertisements in response to the combined advertisement request; and storing in a data store, at the client device, the advertisements received; and wherein the rendering instructions cause the client device to perform operations comprising:

in response to determining that the client device has generated an advertisement request from any of the rendering instructions:

generating, at the client device, a local advertisement request to the data store for the advertisement corresponding to the rendering instruction;

retrieving the advertisement from the advertisements stored in the data store in response to the local advertisement request; and rendering the advertisement in the advertisement slot.

11. The system of claim 10 wherein: the declaration instructions snippets are stored in a head section of the web page source file.

12. The system of claim 10, wherein generating a combined advertisement request comprises:

generating, at the client device, a plurality of advertisement requests, each of the advertisement requests being a corresponding request for each rendering instruction in the web page source document;

assigning, at the client device, an identical pageview identifier to each advertisement request; and combining, at the client device, the plurality of content item requests into the combined content item request.

13. A storage device comprising a computer storage medium storing instructions executable by a client device and that upon such execution cause the client device to perform operations comprising:

identifying, at the client device, requests in a web page source document, the web page source document defining content item environments in a web page, and associating each content item environment with a corresponding request in the web page source document;

for each request:

determining, at the client device, if any of the requests have generated a content item request; and in response to determining that a content item request has not been generated by any of the requests:

generating, at the client device, a combined content item request for content items for all requests in the web page source document, the content items including a corresponding content item responsive to each request;

receiving, at the client device, the content items in response to the combined content item request; and storing in a data store, at the client device, the content items received; and in response to determining that a content item request has been generated by any of the requests:

generating, at the client device, a local content item call to the data store for the content item corresponding to the request;

retrieving the content item from the content items stored in the data store in response to the local content item call; and rendering the content item in a content item environment;

wherein the content items are advertisements.

* * * * *

UNITED STATES PATENT AND TRADEMARK OFFICE
CERTIFICATE OF CORRECTION

PATENT NO.        : 8,219,640 B2                          Page 1 of 1
APPLICATION NO.   : 12/685244
DATED             : July 10, 2012
INVENTOR(S)       : Stephen Tsun and Deepak Jindal It is certified that error appears in the above-identified patent and that said Letters Patent is hereby corrected as shown below:

Title Page, item (56):

First Page, Column 2, Line 2 (Other Publications) – delete "Internaltional" and insert -- International --, therefor.

Claim 11, Column 10, Line 6 – after "instructions" delete "snippets".

Signed and Sealed this
Eighteenth Day of September, 2012

David J. Kappos
*Director of the United States Patent and Trademark Office*